United States Patent
Choi et al.

(10) Patent No.: US 7,453,669 B2
(45) Date of Patent: Nov. 18, 2008

(54) SUSPENSION ASSEMBLY HAVING REINFORCED END-TAB AND ACTUATOR FOR DISK DRIVE ADOPTING THE SAME

(75) Inventors: Byoung-gyou Choi, Suwon-si (KR); Jeong-seon Kim, Suwon-si (KR); Dong-lyoul Shin, Suwon-si (KR); Tcherniak Valeri, Suwon-si (KR); Krasnoslobodtsev Valery, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 193 days.

(21) Appl. No.: 11/039,634

(22) Filed: Jan. 18, 2005

(65) Prior Publication Data
US 2006/0012919 A1  Jan. 19, 2006

(30) Foreign Application Priority Data
Jan. 19, 2004  (KR) .................. 10-2004-0003802

(51) Int. Cl.
*G11B 5/48* (2006.01)
(52) U.S. Cl. ................. 360/245.7; 360/244.2; 360/245; 360/255
(58) Field of Classification Search .............. 360/244.2, 360/245, 245.7, 255
See application file for complete search history.

(56) References Cited

U.S. PATENT DOCUMENTS

| | | | |
|---|---|---|---|
| 5,585,980 A | 12/1996 | Boutaghou | .................. 360/105 |
| 5,995,330 A | 11/1999 | Furay et al. | |
| 6,057,987 A * | 5/2000 | Furay et al. | ............... 360/254.4 |
| 6,151,197 A | 11/2000 | Larson et al. | |
| 6,181,529 B1 | 1/2001 | Aoyagi et al. | |
| 6,201,666 B1 | 3/2001 | Resh | |
| 6,268,982 B1 * | 7/2001 | McGrath et al. | .......... 360/254.7 |
| 6,301,081 B1 | 10/2001 | Fahey | ......................... 360/255 |
| 6,538,850 B1 | 3/2003 | Hadian et al. | |

(Continued)

FOREIGN PATENT DOCUMENTS

JP  11-306704  11/1999

(Continued)

OTHER PUBLICATIONS

Korean Office Action for Application No. 10-2004-0003802 dated Jul. 25, 2005.

(Continued)

*Primary Examiner*—Jefferson Evans
(74) *Attorney, Agent, or Firm*—Staas & Halsey LLP

(57) ABSTRACT

A suspension assembly elastically biasing a slider toward a surface of a disk, in which a read/write head is mounted on the slider. In the suspension assembly, a load beam is coupled to a first portion of a swing arm of the actuator. A flexure supports the slider and has a first end portion fixed to a disk facing surface of the load beam and a second end portion extended toward a first end portion of the load beam. An end-tab is extended from the first end portion of the load beam. When the head is parked, the end-tab is supported by a ramp, which is arranged at an outside of the disk.

16 Claims, 12 Drawing Sheets
(5 of 12 Drawing Sheet(s) Filed in Color)

U.S. PATENT DOCUMENTS

| | | | |
|---|---|---|---|
| 6,611,402 B1 | 8/2003 | Mangold | |
| 6,747,849 B1 * | 6/2004 | Le et al. | 360/245.7 |
| 7,130,157 B2 * | 10/2006 | Sassine et al. | 360/245.7 |
| 2002/0075602 A1 * | 6/2002 | Mangold et al. | 360/245.7 |
| 2003/0214750 A1 * | 11/2003 | Zeng et al. | 360/97.01 |

FOREIGN PATENT DOCUMENTS

| | | |
|---|---|---|
| JP | 11-339410 | 12/1999 |
| JP | 11-345474 | 12/1999 |
| JP | 2000-076811 | 3/2000 |
| JP | 2001-101813 | 4/2001 |

OTHER PUBLICATIONS

European Search Report for European Patent No. 05000918.2-1239.

Japanese Office Action for corresponding Japanese Patent Application No. 2005-011981 dated Apr. 22, 2008 (pp. 1-2).

* cited by examiner

SUSPENSION ASSEMBLY HAVING REINFORCED END-TAB AND ACTUATOR FOR DISK DRIVE ADOPTING THE SAME

CROSS-REFERENCE TO RELATED APPLICATIONS

This application claims the priority of Korean Patent Application No. 2004-3802, filed on Jan. 19, 2004, in the Korean Intellectual Property Office, the disclosure of which is incorporated herein by reference.

BACKGROUND OF THE INVENTION

1. Field of the Invention

The present invention relates to a disk drive, and more particularly, to a suspension assembly having an end-tab, a stiffness of which is reinforced, and an actuator for a disk drive adopting the same.

2. Description of the Related Art

As an information storage device of computer, a hard disk drive (HDD) is a device to reproduce/record data from/on disk using a read/write head.

Such a hard disk drive includes an actuator moving a read/write head to a predetermined position of a disk. The actuator is provided with: a swing arm; a suspension assembly installed in one end portion of the swing arm to elastically bias a slider toward a surface of the disk, the read/write head being mounted on the slider; and a voice coil motor (VCM) rotating the swing arm.

If the hard disk drive is powered on and the disk starts to rotate, the voice mail motor rotates the swing arm to move the slider over a recording surface of the disk. The read/write head mounted on the slider functions to reproduce and/or record data from/on the recording surface of the disk.

If the hard disk drive does not operate, that is, if the disk is stopped, the voice coil motor moves and parks the read/write head outside of the recording surface of the disk, to prevent the read/write head from colliding against the recording surface of the disk. Generally, such head parking systems can be classified into a contact start stop (CSS) system and a ramp loading system. In the CSS system, a parking zone in which data is non-recordable is provided in an inner circumference of the disk, and the head is parked in contact with the parking zone. In the ramp loading system, a ramp is installed outside the disk, and the head is parked on the ramp.

FIG. 1A is a perspective view showing a conventional suspension assembly of an actuator for a disk drive, FIG. 1B is a side view of the conventional suspension assembly of FIG. 1A, and FIG. 1C is a plan view showing the case when an end-tab is in contact with a front end portion of a ramp in the conventional suspension assembly.

Referring to FIGS. 1A and 1B, the suspension assembly 40 of the actuator includes a load beam 41 coupled to one end portion of a swing arm 32, and a flexure 44 supporting a slider 45 on which a head is mounted. A rear end portion of the flexure 44 is fixed to one surface of the load beam 41, that is, a surface facing a disk 20, by a welding or the like. A front end portion of the flexure 44 is freely movable. A limiter 47 limiting a pitching movement of the flexure 44 is provided between the front end portion and rear end portion of the flexure 44. The limiter 47 is extended through an aperture 46 that is positioned on the load beam 41. A dimple 43 protruded toward the flexure 44 is positioned on the load beam 41. A predetermined elastic force is induced to the flexure 44 by the dimple 43. In such a structure, the flexure 44 is freely movable, and thus the slider 45 attached to the flexure 44 can move freely in rolling and pitching directions.

As is described above, a ramp 50 is installed outside the disk 20 to park the head. An end-tab 42 is extendedly positioned on a front end portion of the load beam 41 and supported in contact with a surface of the ramp 50 when parking the head. A front end portion of the ramp 50 is inclined and overlapped with an edge portion of the disk 20 by a predetermined width, such that the end-tab 42 can be loaded and unloaded smoothly.

If the disk drive is powered off, the end-tab 42 is unloaded onto the ramp 50 from the disk 20. At this time, the end-tab 42 lifts up in contact with the inclined surface of the front end portion of the ramp 50. If the end-tab 42 lifts up above a predetermined height, the flexure 44, to which the slider 45 is attached, is separated from the dimple 43 due to an absorptive power between the slider 45 and the disk 20. In addition, a rotation speed of the disk 20 is reduced due to a power-off of the disk drive, and a lifted height of the slider 45 is also reduced.

If the lifted height of the slider 45 is reduced continuously, the head mounted on the slider 45 collides against the disk 20, causing the head and/or the disk 20 to be damaged. It is the limiter 47 that functions to prevent such an occurrence. In other words, when the end-tab 42 lifts up in contact with the inclined surface of the front end portion of the ramp 50, the limiter 47 engages the load beam 41, thereby preventing the lifted height of the slider 45 from being lowered below a predetermined height.

But when the end-tab 42 lifts up in contact with the inclined surface of the front end portion of the ramp 50, a considerable load is applied to the end-tab 42. If stiffness of the end-tab 42 is low, a connecting portion between the load beam 41 and the end-tab 42 may be deflected. If this phenomenon occurs, the limiter 47 cannot perform its own function, such that the head and/or the disk 20 may be damaged due to a collision. Since the slider 45 attached to the flexure 44 is not rapidly separated from the surface of the disk 20, it takes a long time to unload the end-tab 42, thereby degrading performance of the disk drive. In addition, if this phenomenon occurs repeatedly over time, the end-tab 42 may deform due to a fatigue phenomenon.

To overcome the above problems, stiffness of the end-tab needs to be increased. For this purpose, the end-tab may be formed large or thick. In this case, weight of the end-tab increases so that a driving performance of the actuator is degraded. Accordingly, there is demanded an end-tab which is relatively small and lightweight and has high stiffness.

Referring to FIG. 1C, when parking the head, to unload the end-tab 42 onto the ramp 50 before the slider 45 is rotated outside a perimeter of the disk 20, the ramp 50 is installed to overlap the front end portion of the ramp 50 with the edge portion of the disk 20 by a predetermined width D.

The conventional end-tab 42, however, is extended from the front end portion of the load beam 41 along a central axis of the load beam 41. Thus, the overlapped width D between the ramp 50 and the disk 20 is relatively wide, and a data storage space of the disk 20 is accordingly reduced. In addition, when stiffness of the end-tab 42 is low, it takes a long time to unload the end-tab 42. As a result, the overlapped width D between the ramp 50 and the disk 20 must be widened.

In FIGS. 2A through 2C, there is shown a suspension assembly having a longitudinally reinforced end-tab, which is disclosed in U.S. Pat. No. 6,181,529.

Referring to FIGS. 2A through 2C, an end-tab 71 is extendedly positioned on a front end portion of a load beam 58 of a suspension assembly in a longitudinal direction of the load beam 58. A slider 72 is attached to a flexure 75. Longitudinal channels 84 and 93 are positioned on the end-tab 71 along a longitudinal central axis of the end-tab 71. These longitudinal channels 84 and 93 cause stiffness of the end-tab 71 to be increased. In the conventional suspension assembly of FIGS. 2A through 2C, with stiffness of the end-tab 71 being increased, possibility of collision between the end-tab 71 and a disk in the parking of the head is reduced and the end-tab 71 can be unloaded more rapidly.

In the parking of the head, the end-tab 71 encounters a force in a horizontal direction when the end-tab 71 contacts with the front end portion of the ramp, as well as a force in a vertical direction due to the ramp. Seen from the shape of the end-tab 71, stiffness of the conventional end-tab 71 is relatively high in a vertical direction but not sufficiently high in a horizontal direction.

Since the end-tab 71 is extended from the front end portion of the load beam 58 in the longitudinal direction along the central axis of the load beam 58, an overlapped width between the ramp and the disk is relatively wide and thus the data storage space of the disk is reduced.

Compared with the end-tab of FIG. 1A, the end-tab of FIGS. 2A through 2C has an effect that increases the vertical stiffness, but does not have a satisfactory effect in the horizontal stiffness and the overlapped width between the ramp and the disk.

Meanwhile, Japanese Patent Laid-Open Publication No. 1999-306704 discloses an end-tab, which is extended from a front end portion of a load beam in an intersecting direction with respect to a central axis of the load beam. This end-tab has an advantage in that an overlapped width between the ramp and the disk is reduced, but has a disadvantage in that stiffness of the end-tab is insufficient and a twist deformation occurs.

As higher data recording density is demanded, overlapped width between the ramp and the disk needs to be reduced to widen the data recording surface of the disk. To load/unload the end-tab more rapidly, it is necessary to develop an end-tab having higher stiffness.

SUMMARY OF THE INVENTION

The present invention provides a suspension assembly and an actuator for a disk drive adopting the same, which are capable of increasing vertical and horizontal stiffness of an end-tab and increasing data storage space of a disk.

According to an aspect of the present invention, there is provided a suspension assembly of an actuator for a disk drive, which elastically biases a slider toward a surface of a disk, a read/write head being mounted on the slider. The suspension assembly comprises: a load beam coupled to a first portion of a swing arm of the actuator; a flexure that supports the slider, the flexure having a first end portion fixed to a disk facing surface of the load beam and a second end portion extended toward a first end portion of the load beam; and an end-tab extended from the first end portion of the load beam, the end-tab being supported by a ramp arranged in an outside of the disk when the head is parked, wherein the end-tab is deflected from a longitudinal central axis of the load beam toward the outside of the disk while extending from the first end portion of the load beam, thereby increasing both vertical and horizontal stiffness of the end-tab.

According to one aspect, the end-tab is curved in a shape of a bow toward the outside of the disk while extending from the first end portion of the load beam.

According to one aspect, the end-tab is extended straight from the first end portion of the load beam while forming a predetermined angle between a longitudinal central axis of the end-tab and the longitudinal central axis of the load beam.

According to one aspect, the end-tab has a convex cut-away shape toward the ramp.

According to another aspect of the present invention, there is provided an actuator for a disk drive, comprising: a swing arm pivotally mounted on a base member of the disk drive; a suspension assembly elastically biasing a slider toward a surface of a disk, a read/write head to reproduce/record data being mounted on the slider; and a voice coil motor that rotates the swing arm to move the read/write head to a predetermined position of the disk. The suspension assembly comprises: a load beam coupled to a first portion of the swing arm of the actuator; a flexure that supports the slider, the flexure having a first end portion fixed to a disk facing surface of the load beam and a second end portion extended toward a first end portion of the load beam; and an end-tab extended from the first end portion of the load beam, the end-tab being supported by a ramp arranged in an outside of the disk when the head is parked, wherein the end-tab is deflected from a longitudinal central axis of the load beam toward the outside of the disk while extending from the first end portion of the load beam, thereby increasing both vertical and horizontal stiffness of the end-tab.

Compared with the related art, both vertical and horizontal stiffness of the end-tab are increased, and an overlapped width between the ramp and the disk is reduced, resulting in increased data storage space of the disk.

Additional aspects and/or advantages of the invention will be set forth in part in the description which follows, and in part, will be obvious from the description, or may be learned by practice of the invention.

BRIEF DESCRIPTION OF THE DRAWINGS

The Patent or application file contains at least one drawing executed in color. Copies of this Patent or patent application publication with color drawing(s) will be provided by the Office upon request and payment of the necessary fee. These and/or other aspects and advantages of the invention will become apparent and more readily appreciated from the following description of the embodiments, taken in conjunction with the accompanying drawings, of which:

FIGS. 8B-1 and 8B-2 are views illustrating simulation results of stress when a vertical load is applied to the end-tabs according to the related art and the embodiment of the present invention, respectively FIGS. 9A-1 and 9A-2 are views illustrating simulation results of deflection when a horizontal load is applied to the end-tabs according to the related art and the embodiment of the present invention, respectively;

FIGS. 9B-1 and 9B-2 are views illustrating simulation results of stress when a horizontal load is applied to the end-tabs according to the related art and the embodiment of the present invention, respectively; and FIGS. 9C-1 and 9C-2 are views illustrating simulation results of strain when a horizontal load is applied to the end-tabs according to the related art and the embodiment of the present invention, respectively.

DETAILED DESCRIPTION OF THE PREFERRED EMBODIMENTS

Figure 1A:
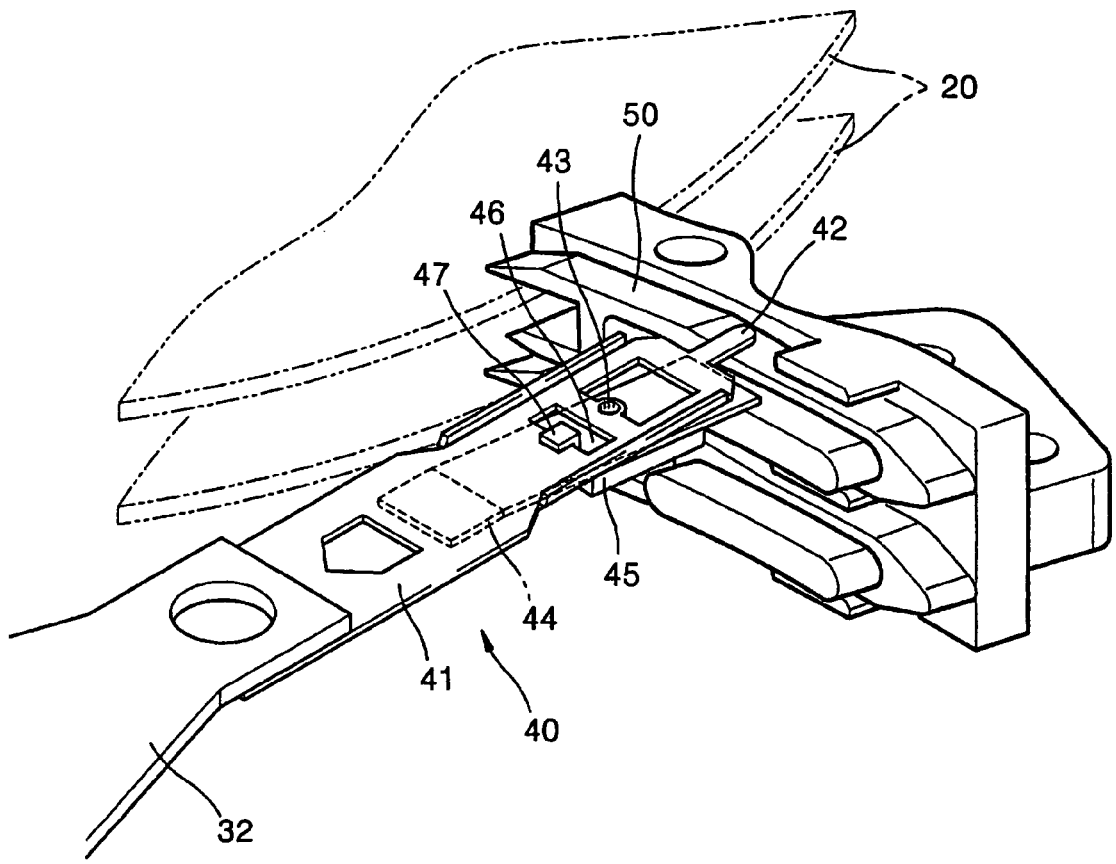
FIG. 1A is a perspective view showing a conventional suspension assembly of an actuator for a disk drive.
Figure 1B:
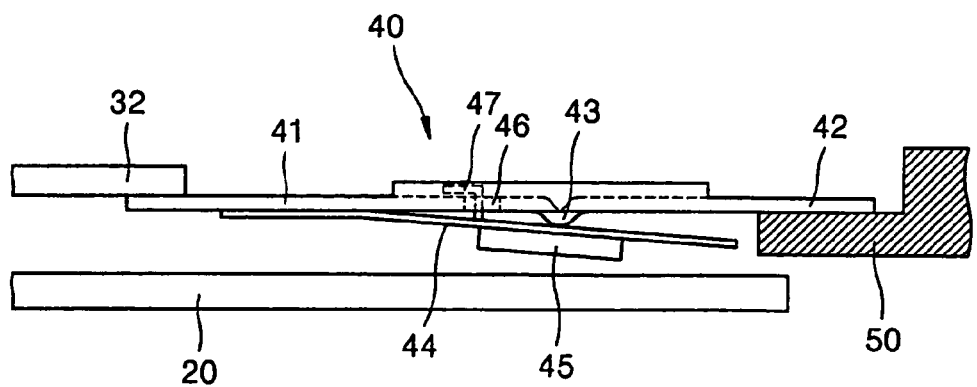
FIG. 1B is a side view of the suspension assembly of FIG. 1A.
Figure 1C:
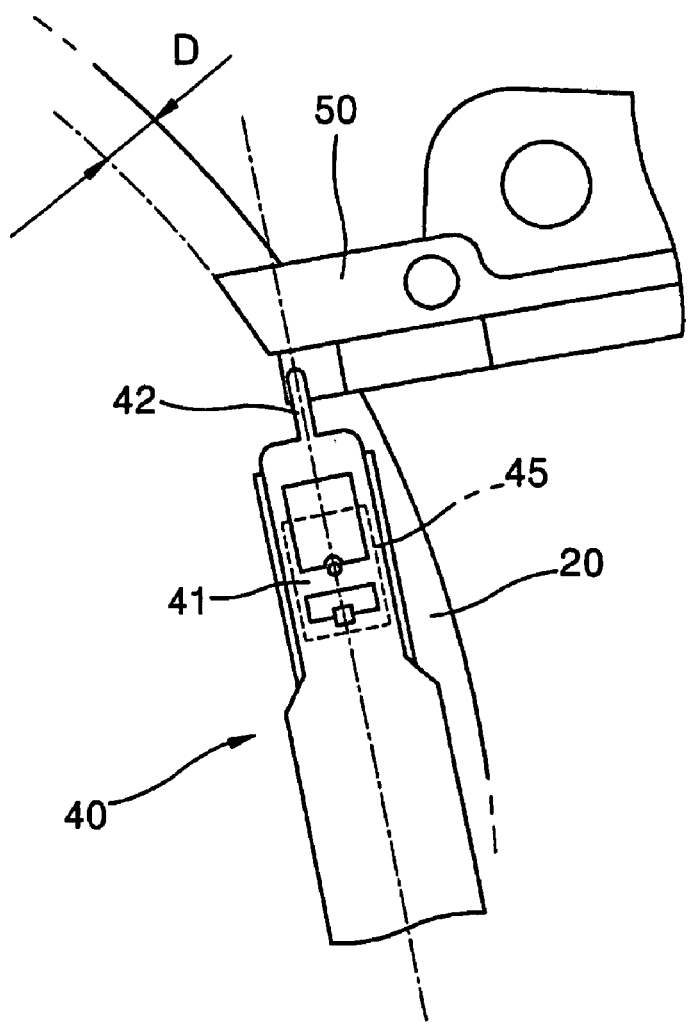
FIG. 1C is a plan view showing an end-tab is contact with a front end portion of a ramp in the conventional suspension assembly of FIG. 1A.

Reference will now be made in detail to embodiments of the present invention, examples of which are illustrated in the accompanying drawings, wherein like reference numerals refer to the like elements throughout. The embodiments are described to explain the present invention by referring to the figures.

In the drawings, the thickness of layers and regions are exaggerated for clarity.

Figure 3:
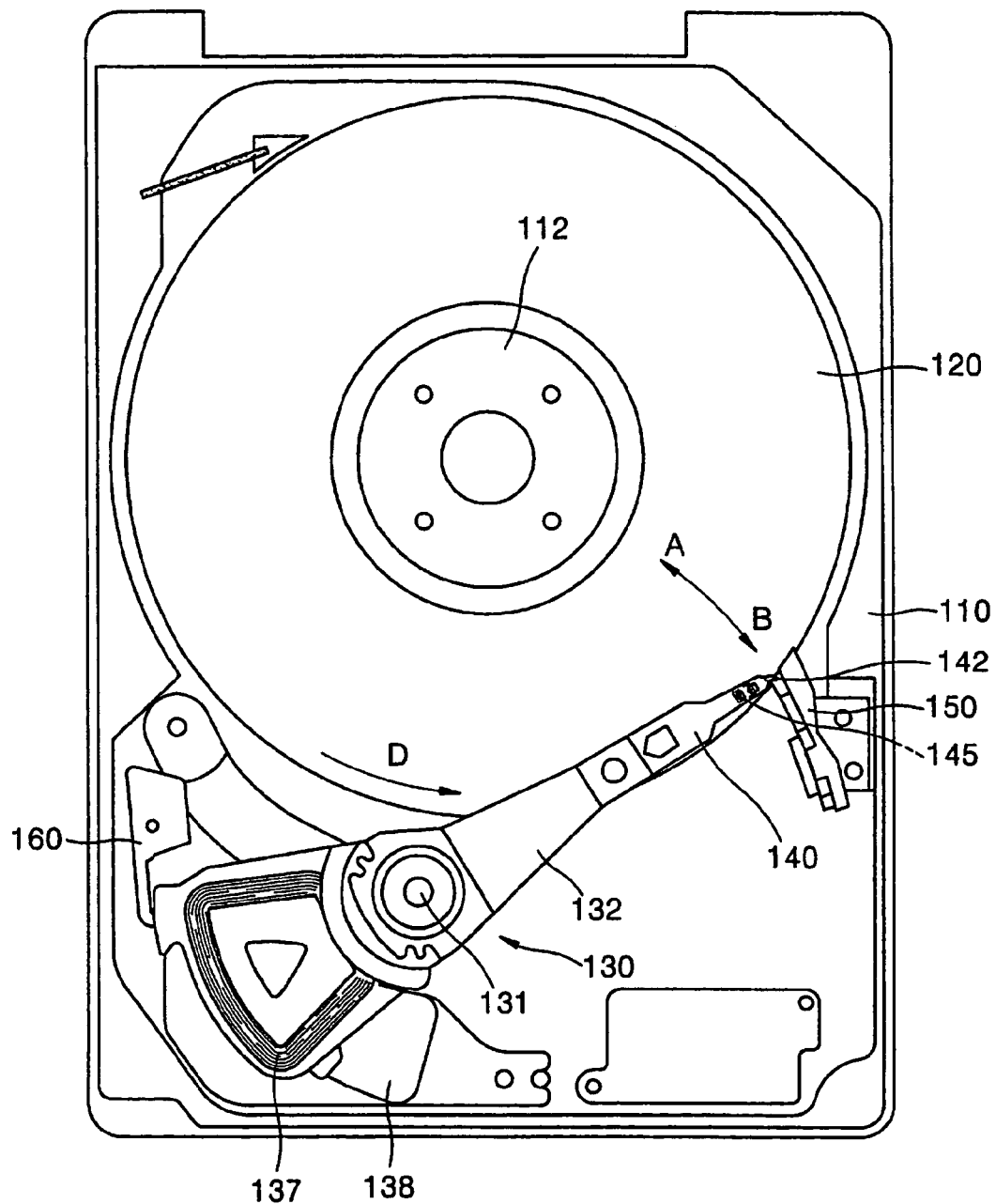
FIG. 3 is a plan view schematically illustrating a structure of a hard disk, which adopts a suspension assembly of an actuator according to an embodiment of the present invention.

FIG. 3 is a plan view schematically illustrating a structure of a hard disk drive, which adopts a suspension assembly of an actuator according to an embodiment of the present invention.

Referring to FIG. 3, the hard disk drive includes: a spindle motor 112 mounted on a base member 110; one or more disks 120 fixedly installed in the spindle motor 112; and an actuator 130 moving a read/write head (not shown) to a predetermined position of the disk 120. Here, the read/write head is a device to reproduce/record data from/on the disk 120.

The actuator 130 includes: a swing arm 132 pivotally mounted on a pivot bearing 131 that is installed in the base member 110; a suspension assembly 140 installed in a first end portion of the swing arm 132 to elastically bias a slider 145 toward a surface of the disk 120, in which the head is mounted on the slider 145; and a voice coil motor (VCM) rotating the swing arm 132.

The voice coil motor is provided with a VCM coil 137 coupled to a second end portion of the swing arm 132 and a magnet 138 arranged to face the VCM coil 137. The voice coil motor constructed as described above is controlled by a servo control system. The voice coil motor rotates the swing arm 132 in a direction based on Fleming's left hand rule by an interaction between current inputted to the VCM coil 137 and magnetic field induced by the magnet 138.

Particularly, if the hard disk drive is powered on and the disk 120 starts to rotate in a direction indicated by arrow D, the voice coil motor rotates the swing arm 132 in a counter-clockwise direction indicated by arrow A, such that the slider 145, on which the read/write head is mounted, is moved over a recording surface of the disk 120. The slider 145 lifts up from the surface of the disk 120 to a predetermined height by a lift force, which occurs due to the rotating disk 120. In this state, the read/write head mounted on the slider 145 reproduces/records data from/on the recording surface of the disk 120.

If the hard disk drive is powered off and the disk 120 is stopped, the voice coil motor rotates the swing arm 132 in a clockwise direction, indicated by arrow B, to prevent the head from colliding against the recording surface of the disk 120, such that the read/write head is moved and parked outside of the recording surface of the disk 120. For this purpose, a ramp 150 is installed outside the disk 120, and an end-tab 142 is provided in the suspension assembly 140. The end-tab 142 is moved from the disk 120 to the ramp 150, and is then supported by the ramp 150.

If the read/write head is parked on the ramp 150 and is not locked, the actuator 130 may be rotated arbitrarily due to external shock or vibration applied to the disk drive, and may escape from the ramp 150, thus moving toward the recording surface of the disk 120. In such a case, the head may contact the recording surface of the disk 120, resulting in damage of the head and/or the recording surface of the disk 120. Accordingly, when the disk 120 is stopped and the head is parked on the ramp 150, the actuator 130 needs to be locked to a predetermined position to prevent arbitrary rotation. For this purpose, an actuator latch 160 is provided.

Figure 4:
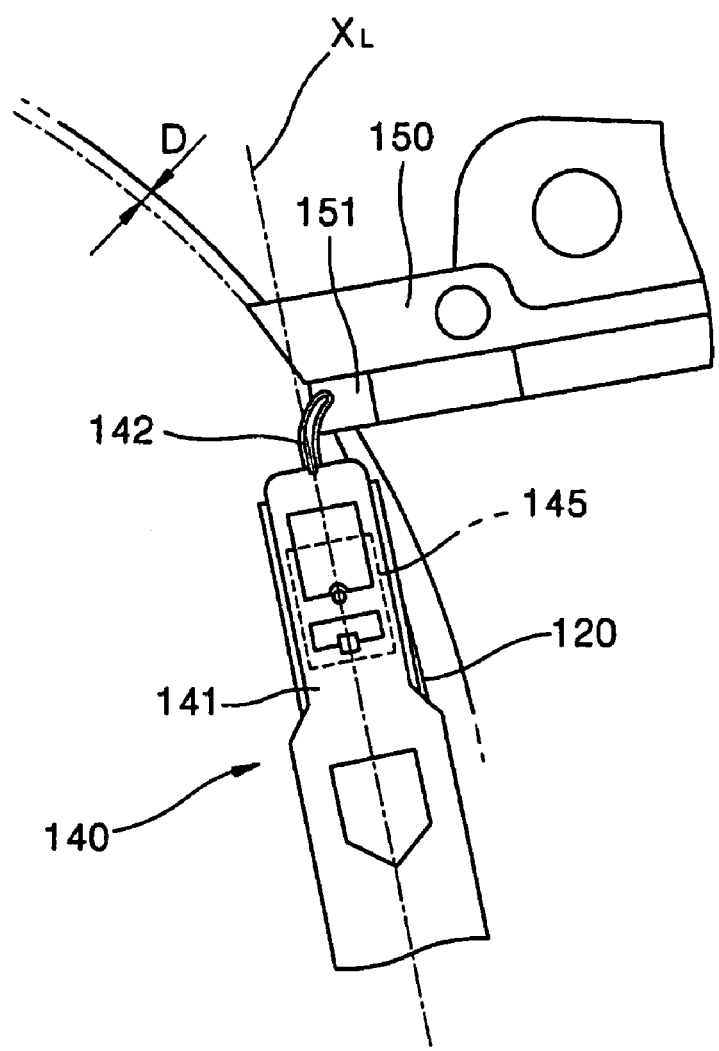
FIG. 4 is an enlarged plan view of the suspension assembly of FIG. 3.
Figure 5:
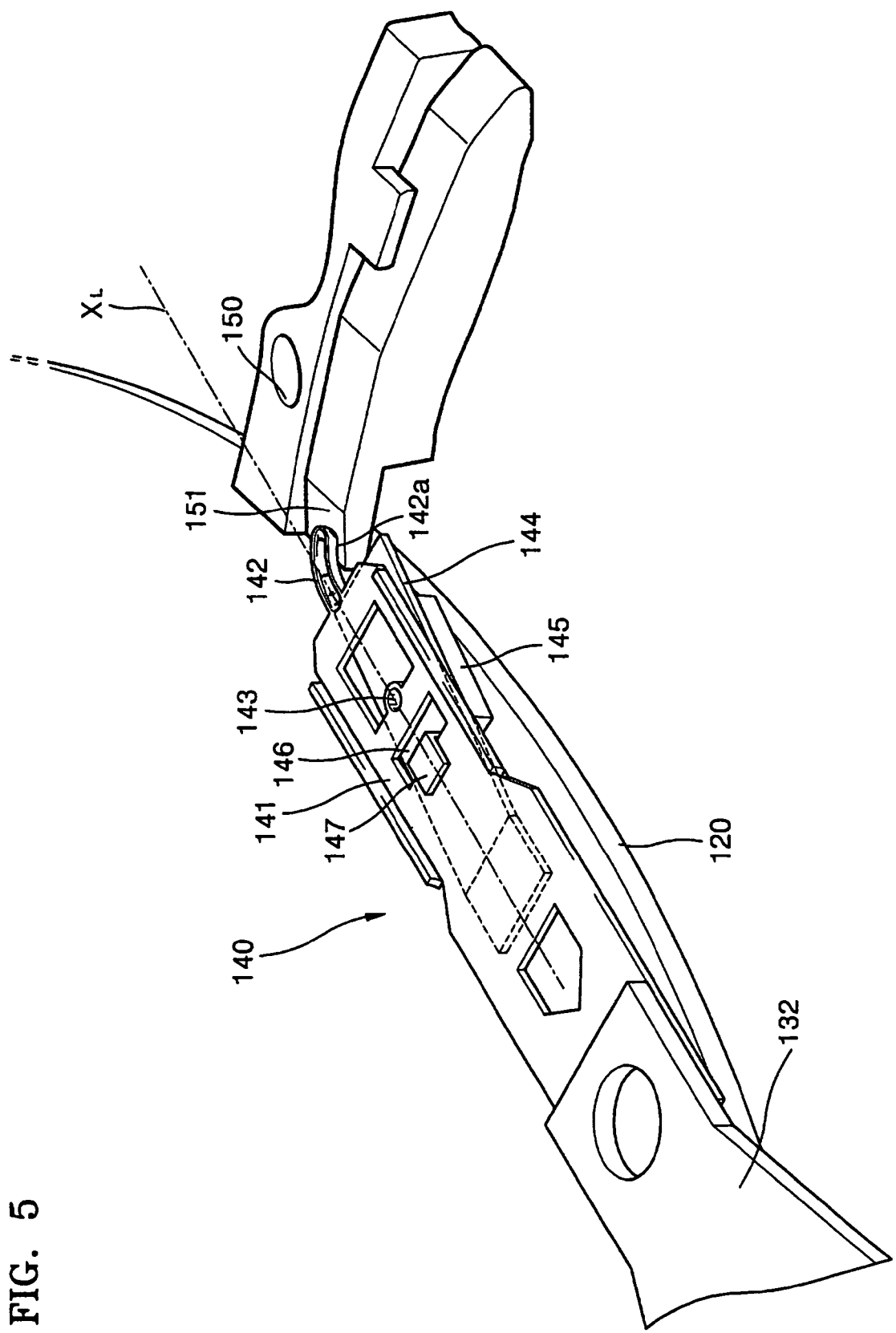
FIG. 5 is a perspective view of the suspension assembly of FIG. 3.
Figure 6:
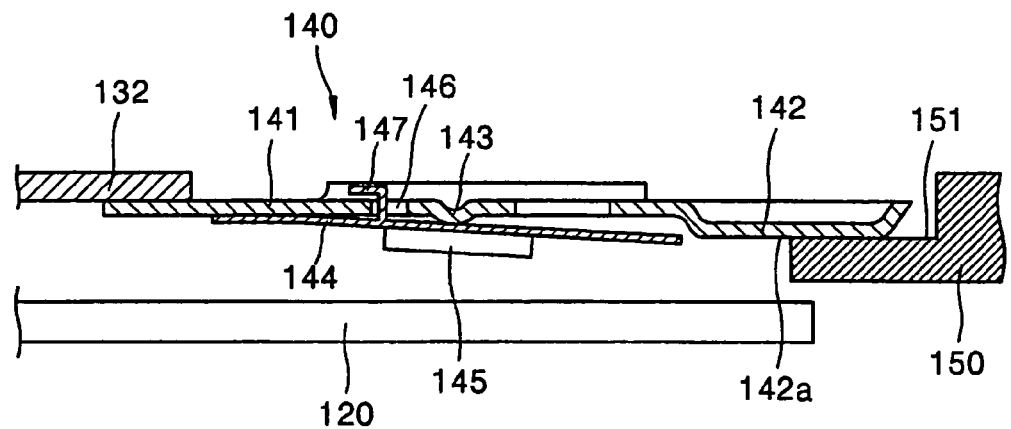
FIG. 6 is a cross-sectional view of the suspension assembly of FIG. 3.

FIG. 4 is an enlarged plan view of the suspension assembly of FIG. 3, FIG. 5 is a perspective view of the suspension assembly of FIG. 3, and FIG. 6 is a cross-sectional view of the suspension assembly of FIG. 4.

Referring to FIGS. 4 through 6, the suspension assembly 140 is provided in the actuator 130 and elastically biases the slider 145 toward the surface of the disk 120. Here, the read/write head is mounted on the slider 145.

The suspension assembly 140 includes a load beam 141, a flexure 144, and the end-tab 142. In the parking of the head, the end-tab 142 is supported by the ramp 150, which is disposed outside the disk 120.

The load beam 141 is coupled to an end portion of the swing arm 132 of the actuator 130. According to one embodiment, the load beam 141 is made by pressing metal plate, such as stainless steel, which has a thin thickness of, for example, about 0.05 mm. To increase stiffness of the load beam 141, both edges of the load beam 141 are bent upwardly.

The flexure 144 supports the slider 145, on which the head is mounted. The flexure 144 is attached to a bottom surface of the load beam 141, that is, a surface facing the disk 120. According to one embodiment, a rear end portion of the flexure 144 is fixed to the disk facing surface of the load beam 141 by a welding or the like. And a front end portion of the flexure 144 is extended toward the front end portion of the load beam 141, such that the flexure 144 is movable somewhat freely. According to one embodiment, like the load beam 141, the flexure 144 is made of thin stainless steel. The flexure 144, however, is formed thinner than the load beam 141, for example, about 0.02 mm thick, enabling free rolling and pitching of the slider 145 attached thereto.

A limiter 147 is provided between the front end portion and the rear end portion of the flexure 144 to limit a rolling movement of the flexure 144. The limiter 147 is extended through an aperture 146, which is positioned on the load beam 141.

A dimple 143 is protrudedly positioned on the load beam 141 toward the flexure 144, to provide a predetermined elastic force to the flexure 144. Due to such a structure, the flexure 144 is movable freely, thus achieving the smooth rolling and pitching of the slider 145 attached to the flexure 144.

The end-tab 142 is deflected from a longitudinal central axis XL of the load beam 141 toward an outside of the disk 120, that is, toward the ramp 150, while extending from the front end portion of the load beam 141. Specifically, the end-tab 142 is curved in a shape of a bow toward the outside of the disk 120 while extending from the front end portion of the load beam 141. In addition, according to one embodiment, the end-tab 142 has a convex cut-away shape toward an inclined surface 151 of the ramp 150 all over the longitudinal direction. In other words, a cross sectional shape of the end-tab 142 is convex with respect to the ramp 150. Additionally, the cross sectional shape of the end-tab 142, taken approximately perpendicular to the curved bow shape of the end-tab 142, is concave with respect to a surface of the end-tab 242 opposite the disk 120. Further, the cross sectional shape of the end-tab 142, taken approximately perpendicular to the curved bow shape of the end-tab 142, is approximately constant throughout the curved bow shape, between first and second ends of the end-tab 142.

Compared with the related art, stiffness of the end-tab 142 constructed as described above is increased in a horizontal direction as well as a vertical direction. Therefore, in the parking of the head, it is possible to restrain collision between the slider 145 and the disk 120 caused by the deformation of the end-tab 142, thereby preventing damage of the disk 120 and the head mounted on the slider 145. In addition, damage of the end-tab 142 due to repeated deformation of the end-tab 142 over time can be prevented, and thus a life-time of the end-tab 142 is increased. A description about this will be made later with reference to simulation results.

Stiffness of the end-tab 142 is increased because the end-tab 142 is formed in a convex cut-away shape toward the inclined surface 151 of the ramp 150. In addition, in the parking of the head, a convex surface 142a of the end-tab 142 contacts with the inclined surface 151 of the ramp 150. Therefore, a contact area of the end-tab 142 and the ramp 150 decreases, compared with flat-shaped end-tabs. As a result, in the loading/unloading of the end-tab 142, abrasion caused by friction between the end-tab 142 and the ramp 150 is reduced.

Further, since the end-tab 142 is curved toward the ramp 150, stiffness of the end-tab 142 is increased, so that loading and unloading are achieved rapidly. Thus, an overlapped width D between the ramp 150 and the disk 120 is reduced compared with the related art, such that data storage space of the disk 120 increases.

Figure 7:
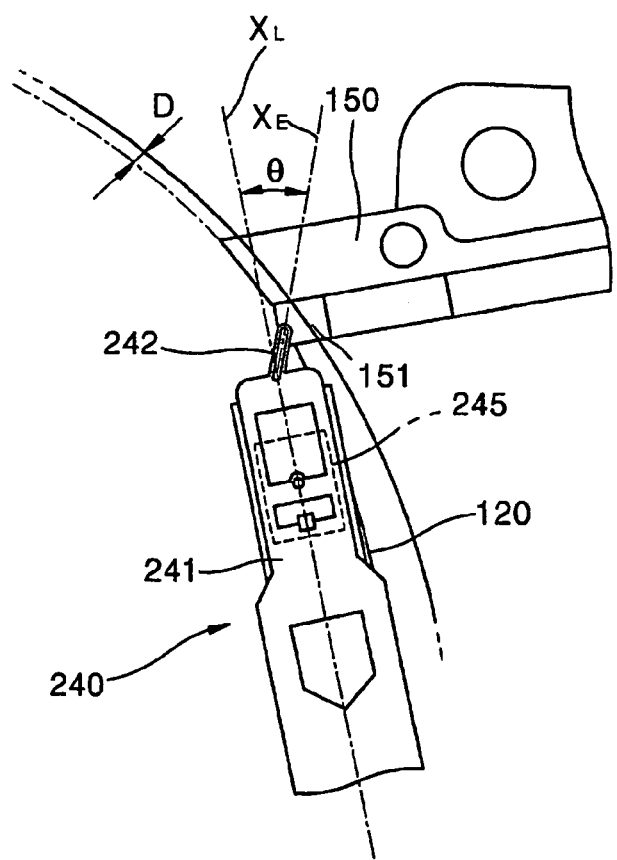
FIG. 7 is a plan view of a suspension assembly according to another embodiment of the present invention.

FIG. 7 is a plan view of a suspension assembly according to another embodiment of the present invention. The suspension assembly of FIG. 7 has the same structure as the suspension assembly of FIG. 3, except for a shape of the end-tab. Therefore, only the shape of the end-tab will be described below.

Referring to FIG. 7, the suspension assembly 240 includes a load beam 241 supporting a slider 245, and an end-tab 242 is provided on a front end portion of the load beam 245. The end-tab 242 is deflected from a longitudinal central axis $X_L$ of the load beam 241 toward the outside of the disk 120, that is, toward the ramp 150, while extending from the front end portion of the load beam 241. Specifically, the end-tab 242 is extended straight from the front end portion of the load beam 241 while forming a predetermined angle Θ between a longitudinal central axis $X_E$ of the end-tab 242 and the longitudinal central axis $X_L$ of the load beam 241. According to one embodiment, like the suspension assembly of FIG. 3, the end-tab 242 has a convex cut-away shape toward the ramp 150. In other words, a cross sectional of the end-tab 242 is convex with respect to the ramp 150. Additionally, the cross sectional shape of the end-tab 242, taken approximately perpendicular to the longitudinal central axis $X_E$ of the end-tab 242, is concave with respect to a surface of the end-tab 242 opposite the disk 120. Further, the cross sectional shape of the end-tab 242, taken approximately perpendicular to the longitudinal central axis $X_E$, is approximately constant between first and second ends of the end-tab 242.

As is described with regard to the suspension assembly of FIG. 3, stiffness of the end-tab 242 constructed as described above is increased in both the vertical and horizontal directions, and the overlapped width D between the ramp 150 and the disk 120 is also reduced, compared with the related art. Specifically, in this embodiment, since the end-tab 242 has the straight extended shape, the end-tab 242 can be manufactured more simply compared with the bow-shaped end-tab 142.

Figure 2A:
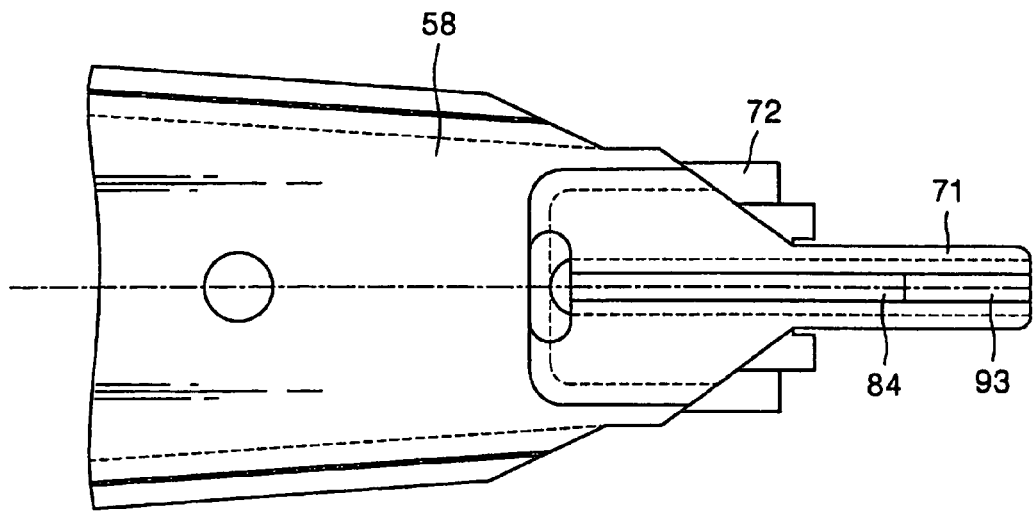
FIG. 2A is a plan view of a conventional suspension assembly having a longitudinally reinforced end-tab.
Figure 2B:
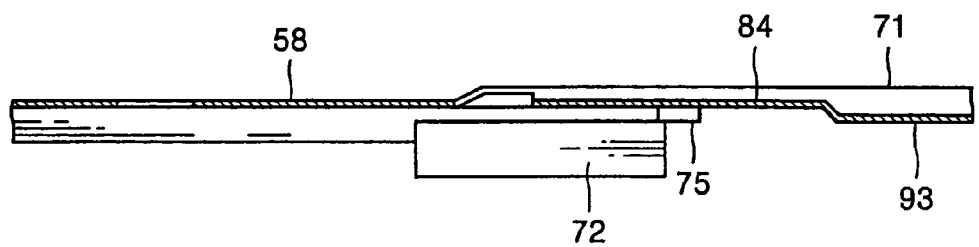
FIG. 2B is a longitudinal sectional view of the conventional suspension assembly of FIG. 2A.
Figure 2C:
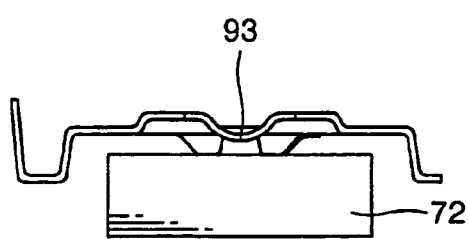
FIG. 2C is a front view of the suspension assembly of FIG. 2A.

Hereinafter, vertical and horizontal stiffness of the end-tabs according to the related art and an embodiment of the present invention will be compared with reference to simulation results. In this simulation, the end-tab of FIG. 4 is used as the embodiment of the present invention and the end-tab of FIG. 2A is used as the end-tab according to the related art.

Figures 1, 8A:
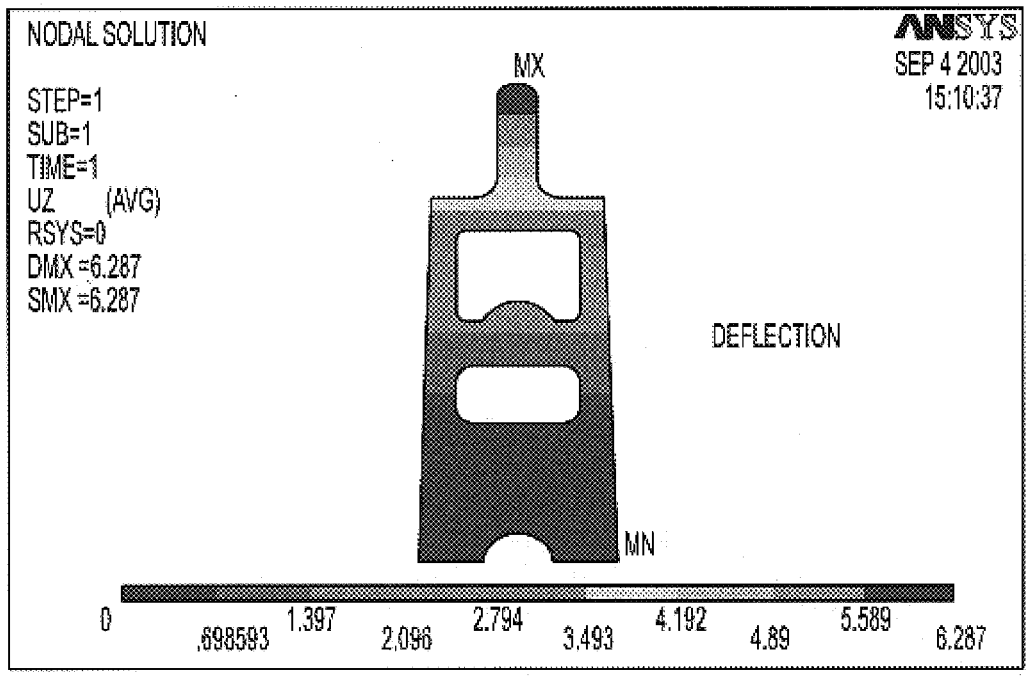
FIGS. 8A-1 and 8A-2 are views illustrating simulation results of deflection when a vertical load is applied to the end-tabs according to the related art and an embodiment of the present invention, respectively.
Figures 2, 8A:
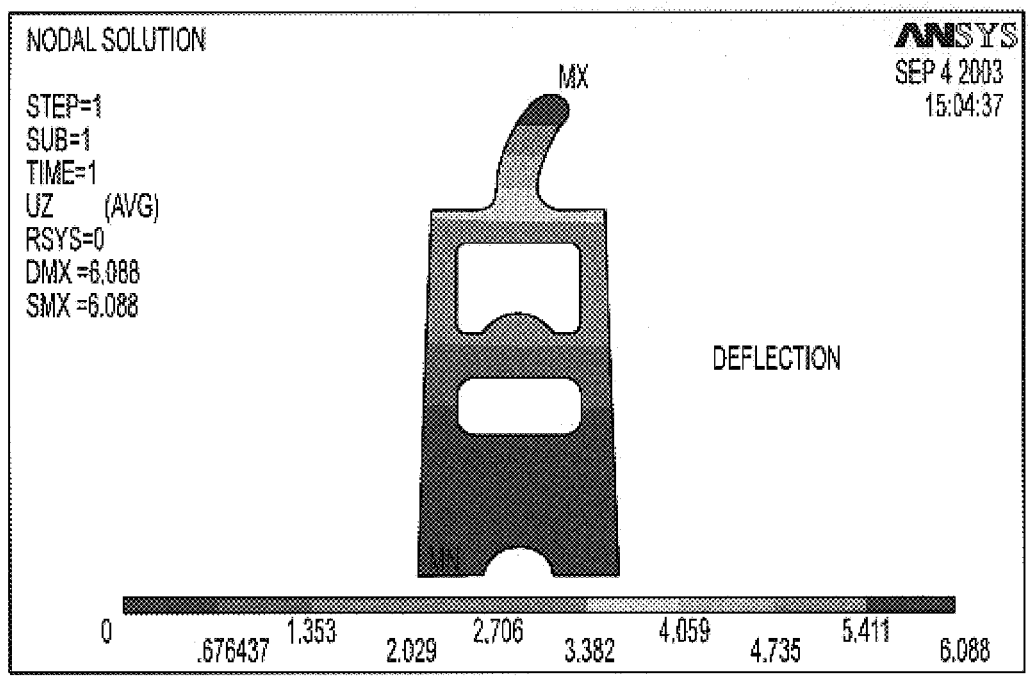
Figures 1, 8B:
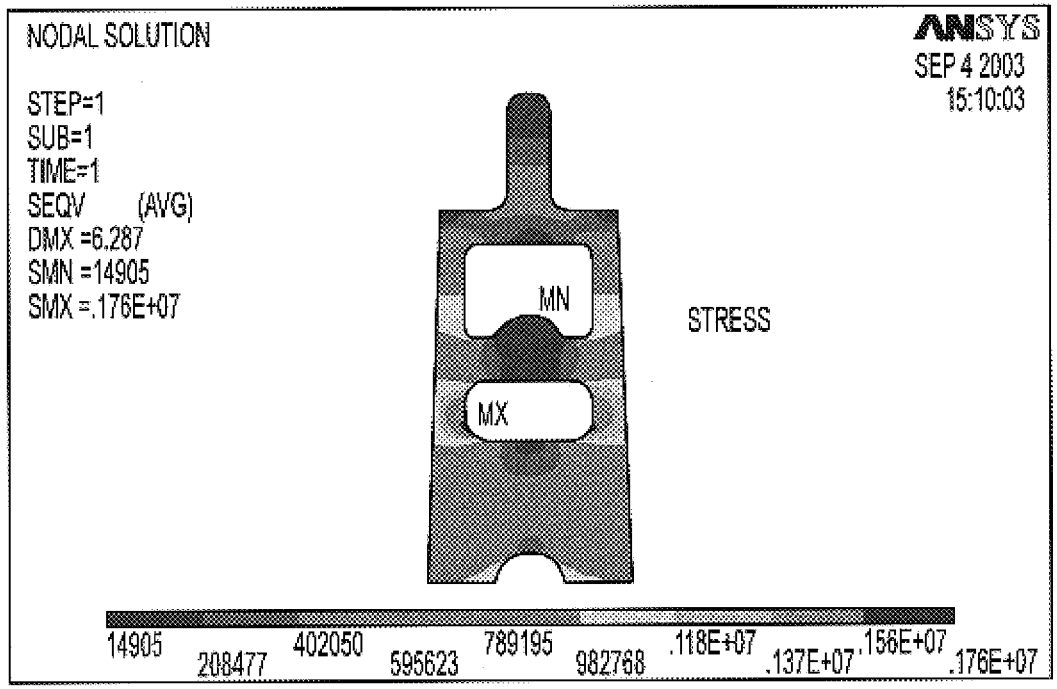
Figures 2, 8B:
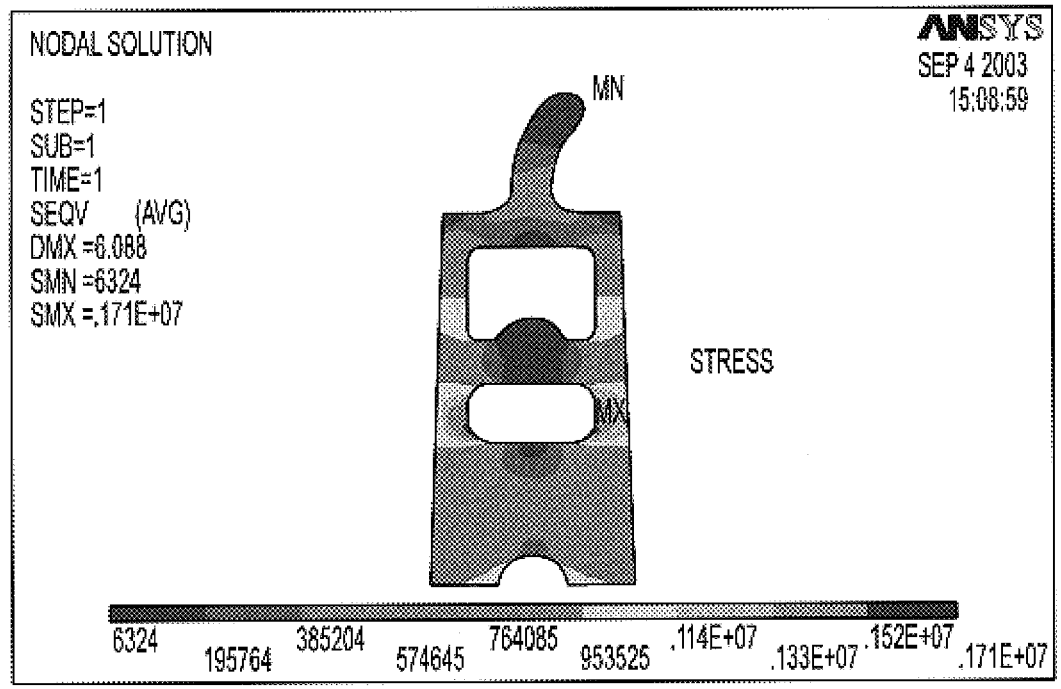

FIGS. 8A and 8B are views illustrating simulation results of deflection and stress when a vertical load is applied to the end-tabs according to the related art and the embodiment of the present invention, and Table 1 shows numerical data of the respective results.

TABLE 1

| Class | Related art | Present invention | Rate of reduction |
| --- | --- | --- | --- |
| Deflection | 6.287 | 6.088 | 3.2% |
| Stress | 1.76E + 06 | 1.71E + 06 | 2.8% |

Referring to FIGS. 8A and 8B and Table 1, when the vertical load is applied to both the end-tab 71 and the bow-shaped end-tab 142, deflection of the end-tab 142 is reduced by about 3.2%, compared with the end-tab 71. In addition, stress of the end-tab 142 is reduced by about 2.8%, compared with the end-tab 71.

Figures 1, 9A:
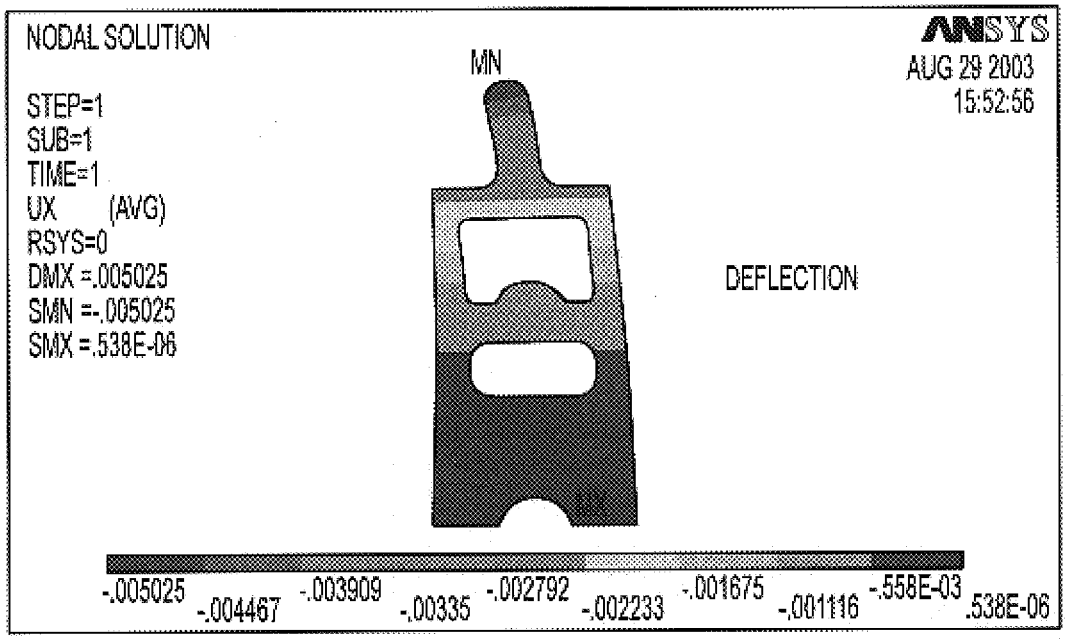
Figures 2, 9A:
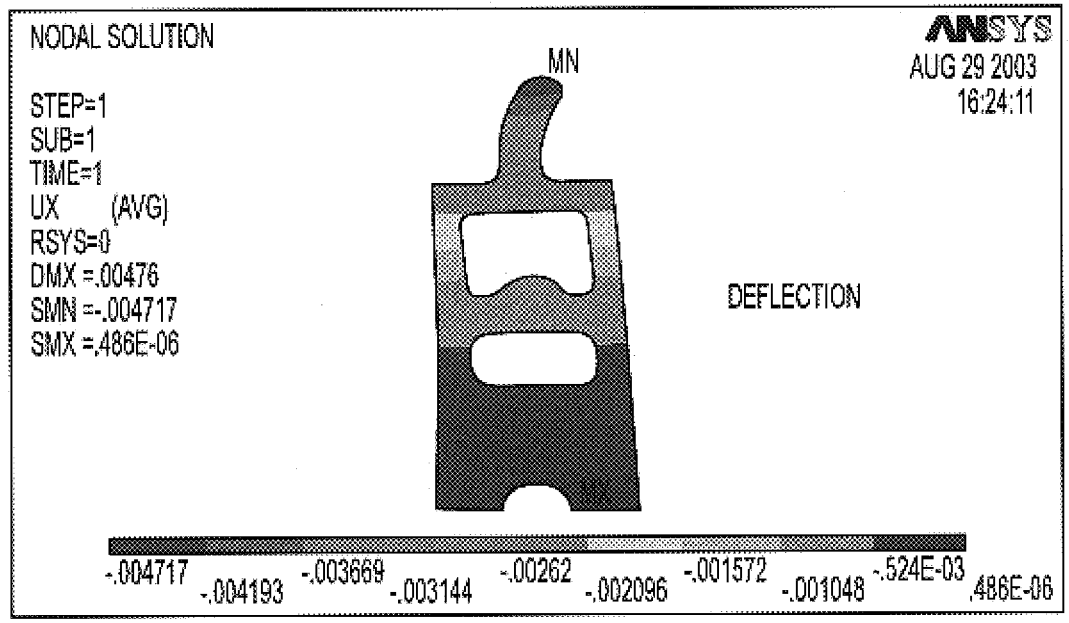
Figures 1, 9B:
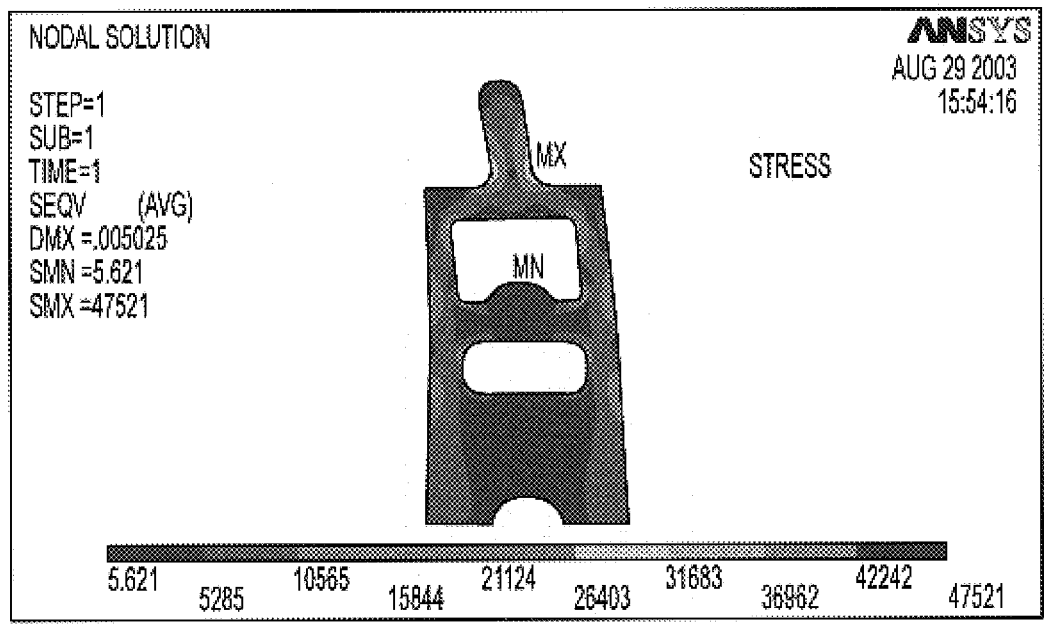
Figures 2, 9B:
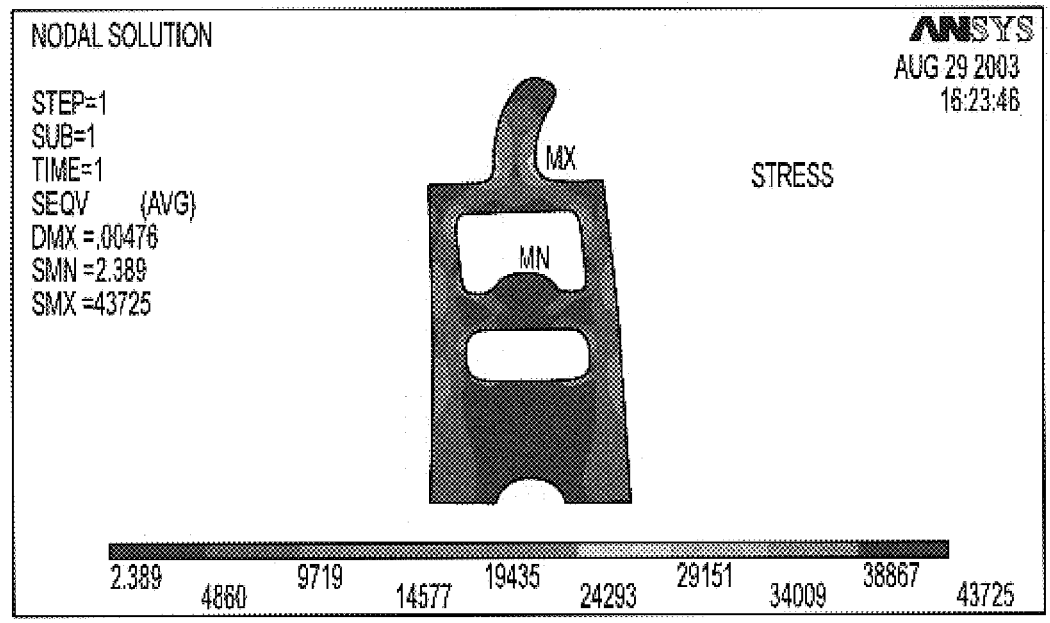
Figures 1, 9C:
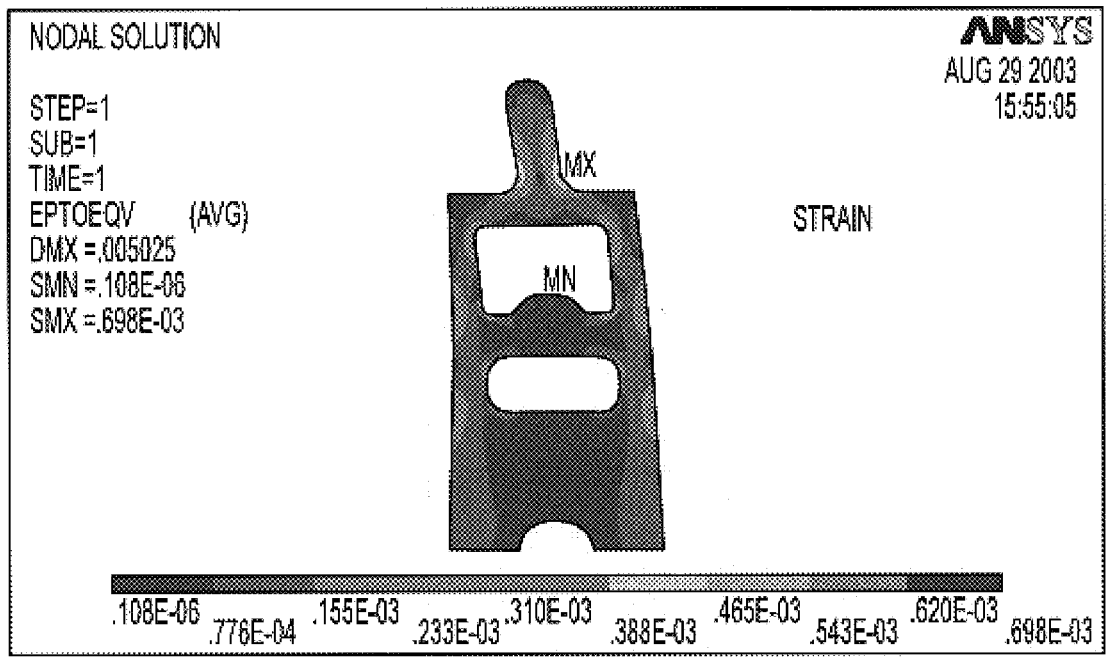
Figures 2, 9C:
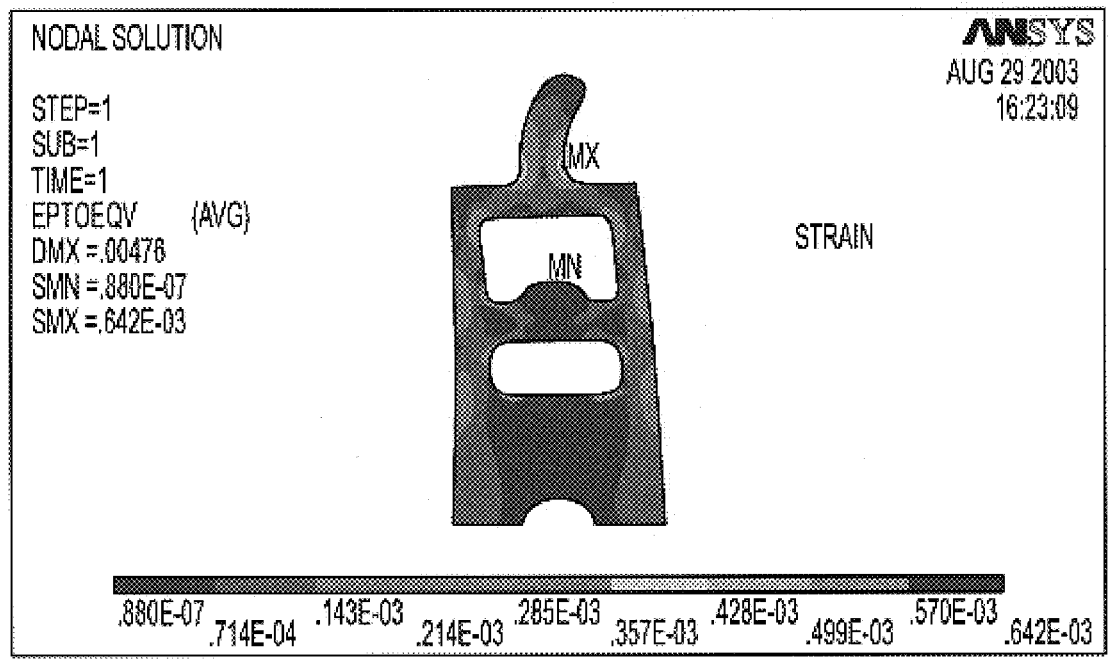

FIGS. 9A through 9C are views illustrating simulation results of deflection, stress and strain when a horizontal load is applied to the end-tabs 71 and 142, and Table 2 shows numerical data of the respective results.

TABLE 2

| Class | Related art | Present invention | Rate of reduction |
| --- | --- | --- | --- |
| Deflection | 0.005025 | 0.004717 | 6.1% |
| Stress | 47521 | 43725 | 8.0% |
| Strain | 6.98E − 04 | 6.42E − 04 | 8.0% |

Referring to FIGS. 9A through 9C and Table 2, when the horizontal load is applied to both the end-tab 71 and the bow-shaped end-tab 142, deflection of the end-tab 142 is reduced by about 6.1%, compared with the end-tab 71. Also, stress of the end-tab 142 is reduced by about 8.0%, compared with the end-tab 71. In addition, strain of the end-tab 142 is reduced by about 8.0%, compared with the end-tab 71.

As is described above, it can be seen that the end-tab of the suspension assembly 140 has higher stiffness in the horizontal direction as well as the vertical direction than the suspension assembly 40 according to the related art. Specifically, the horizontal stiffness of the end-tab 142 is significantly increased, compared with the end-tab 71. In addition, because both the vertical and horizontal stiffness of the end-tab 142 is increased, resistance to twist deformation of the end-tab 142 is also increased.

As is described above, embodiments of the present invention significantly increase the vertical and horizontal stiffness of the end-tab, compared with the related art, by deflecting the end-tab from the longitudinal central axis of the load beam toward the outside of the disk while extending from the front end portion of the load beam. Therefore, in the parking of the head, it is possible to restrain the collision between the head and the disk, which is caused by the deformation of the end-tab, thereby preventing damage of the disk and the head. Further, damage of the end-tab due to repeated deformation of the end-tab over time is prevented, and thus a life-time of the end-tab is increased.

Additionally, according to the end-tab constructed as described above, the overlapped width between the ramp and the disk is reduced, resulting in increased data storage space of the disk.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A suspension assembly of an actuator for a disk drive, which elastically biases a slider toward a surface of a disk, a read/write head being mounted on the slider, the suspension assembly comprising:
   a load beam coupled to a first portion of a swing arm of the actuator;
   a flexure that supports the slider, the flexure having a first end portion fixed to a disk facing surface of the load beam and a second end portion extended toward a first end portion of the load beam; and
   an end-tab extended from the first end portion of the load beam, the end-tab being supported by a ramp arranged in an outside of the disk when the head is parked,
   wherein the end-tab is deflected from a longitudinal central axis of the load beam toward the outside of the disk and extends from the first end portion of the load beam while having an inner periphery and an outer periphery both being curved in a shape of a bow toward the outside of the disk, thereby increasing both vertical and horizontal stiffness of the end-tab.

2. The suspension assembly of claim 1, wherein the end-tab has a convex cross sectional shape toward the ramp.

3. The suspension assembly of claim 2, wherein, the convex cross sectional shape of the end-tab is substantially constant throughout the curved bow shape, between first and second ends of the end-tab.

4. An actuator for a disk drive, comprising:
   a swing arm pivotally mounted on a base member of the disk drive;
   a suspension assembly elastically biasing a slider toward a surface of a disk, a read/write head to reproduce/record data being mounted on the slider; and
   a voice coil motor that rotates the swing arm to move the read/write head to a predetermined position of the disk,
   wherein the suspension assembly comprises:
      a load beam coupled to a first portion of the swing arm of the actuator,
      a flexure that supports the slider, the flexure having a first end portion fixed to a disk facing surface of the load beam and a second end portion extended toward a first end portion of the load beam, and
      an end-tab having an inner periphery and an outer periphery both extending linearly and substantially parallel to each other from the first end portion of the load beam, the end-tab being supported by a ramp arranged in an outside of the disk when the head is parked, and
      wherein the end-tab is angled away from a longitudinal central axis of the load beam such that a free end of the end-tab is deflected way from a center of the disk with respect to the longitudinal central axis while extending from the first end portion of the load beam, thereby increasing both vertical and horizontal stiffness of the end-tab.

5. The actuator of claim 4, wherein the end-tab is curved in a shape of a bow toward the outside of the disk while extending from the first end portion of the load beam.

6. The actuator of claim 4, wherein the end-tab is extended straight from the first end portion of the load beam while forming a predetermined angle between a longitudinal central axis of the end-tab and the longitudinal central axis of the load beam.

7. The actuator of claim 4, wherein the end-tab has a convex cut-away shape toward the ramp.

8. A suspension assembly of an actuator of a disk drive, comprising:
   a load beam extending from a swing arm of the actuator and having an aperture therethrough and a dimple extending in a first direction;
   a flexure connected to the load beam, elastically biased in the first direction by the dimple, and having a limiter extending through the aperture to engage the load beam, to limit travel of the flexure in the first direction; and
   an end-tab extending from an end of the load beam at an angle away from a longitudinal central axis of the load beam to engage a ramp during parking of the actuator, wherein a free end of the end-tab is deflected away from a center of the disk with respect to the longitudinal central axis, while extending from the end of the load beam.

9. The suspension assembly according to claim 8, wherein a surface of the end-tab engaging the ramp during parking of the actuator is convex.

10. The suspension assembly according to claim 9, wherein a surface of the end-tab opposite the convex surface is concave.

11. The suspension assembly according to claim 8, wherein the end-tab has a bow shape curved toward the ramp.

12. The suspension assembly according to claim 11, wherein a cross sectional shape of the end-tab taken approximately perpendicular to the curved bow shape is convex with respect to a surface of the end-tab engaging the ramp during parking of the actuator, and concave with respect to a surface of the end-tab opposite the convex surface.

13. The suspension assembly according to claim 12, wherein the cross sectional shape of the end-tab is approximately constant throughout the curved bow shape, between first and second ends of the end-tab.

14. The suspension assembly according to claim 8, wherein the end-tab extends linearly toward the ramp, such that a longitudinal central axis of the end-tab forms an angle with the longitudinal central axis of the load beam.

15. The suspension assembly according to claim 14, wherein a cross sectional shape of the end-tab taken approximately perpendicular to the longitudinal central axis of the end-tab is convex with respect to a surface of the end-tab engaging the ramp during parking of the actuator, and concave with respect to a surface of the end-tab opposite the convex surface.

16. The suspension assembly according to claim 15, wherein the cross sectional shape of the end-tab is approximately constant between first and second ends of the end-tab.

* * * * *

UNITED STATES PATENT AND TRADEMARK OFFICE
CERTIFICATE OF CORRECTION

PATENT NO. : 7,453,669 B2
APPLICATION NO. : 11/039634
DATED : November 18, 2008
INVENTOR(S) : Byoung-gyou Choi et al.

It is certified that error appears in the above-identified patent and that said Letters Patent is hereby corrected as shown below:

Column 10, Line 3, change "way" to --away--.

Signed and Sealed this

Seventeenth Day of February, 2009

JOHN DOLL
*Acting Director of the United States Patent and Trademark Office*